United States Patent
Saunders et al.

(10) Patent No.: US 9,600,060 B2
(45) Date of Patent: *Mar. 21, 2017

(54) LINK POWER MANAGEMENT IN AN I/O INTERCONNECT

(71) Applicant: Intel Corporation, Santa Clara, CA (US)

(72) Inventors: Bradley Saunders, Portland, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 14/506,465

(22) Filed: Oct. 3, 2014

(65) Prior Publication Data

US 2015/0113307 A1 Apr. 23, 2015

Related U.S. Application Data

(63) Continuation of application No. 13/434,782, filed on Mar. 29, 2012, now Pat. No. 8,880,923.

(51) Int. Cl.
*G06F 1/26* (2006.01)
*G06F 3/00* (2006.01)
(Continued)

(52) U.S. Cl.
CPC ............ *G06F 1/3278* (2013.01); *G06F 1/325* (2013.01); *G06F 1/3253* (2013.01); *G06F 13/42* (2013.01); *Y02B 60/126* (2013.01); *Y02B 60/1235* (2013.01)

(58) Field of Classification Search
CPC ...................................................... G06F 1/325
See application file for complete search history.

(56) References Cited

U.S. PATENT DOCUMENTS

| 4,767,168 A | 8/1988 | Grandy |
| 4,969,924 A | 11/1990 | Suverison et al. |

(Continued)

FOREIGN PATENT DOCUMENTS

| JP | 04-138677 A | 5/1992 |
| JP | 06-334687 A | 12/1994 |

(Continued)

OTHER PUBLICATIONS

International Search Report and Written Opinion received for International Application No. PCT/US2008/084621, mailed on May 18, 2009.

(Continued)

*Primary Examiner* — Nitin Patel
(74) *Attorney, Agent, or Firm* — Schwabe, Williamson & Wyatt, P.C.

(57) ABSTRACT

Described are embodiments of methods, apparatuses, and systems for link power management in an I/O interconnect. An apparatus for link power management in an I/O interconnect of a computer apparatus may include a switching fabric having a first switch and a second switch, configured to simultaneously transport first data packets over a first path of a link between a port of the first switch and a port of the second switch and second data packets over a second path of the link. The apparatus may include a power management unit configured to modify a power state of the port of the first switch based at least in part on relative power states of the first path and the second path. Other embodiments may be described and claimed.

19 Claims, 8 Drawing Sheets

(51) Int. Cl.
  *G06F 1/32* (2006.01)
  *G06F 13/42* (2006.01)

(56) References Cited

U.S. PATENT DOCUMENTS

| | | |
|---|---|---|
| 5,109,452 A | 4/1992 | Selvin et al. |
| 5,138,614 A | 8/1992 | Baumgartner et al. |
| 5,138,615 A | 8/1992 | Lamport et al. |
| 5,242,315 A | 9/1993 | O'Dea |
| 5,267,337 A | 11/1993 | Kirma |
| 5,386,567 A | 1/1995 | Lien et al. |
| 5,419,717 A | 5/1995 | Abendschein et al. |
| 5,535,036 A | 7/1996 | Grant |
| 5,781,744 A | 7/1998 | Johnson et al. |
| 6,038,630 A | 3/2000 | Foster et al. |
| 6,067,612 A | 5/2000 | Sasaki et al. |
| 6,108,782 A | 8/2000 | Fletcher et al. |
| 6,256,309 B1 | 7/2001 | Daley et al. |
| 6,272,551 B1 | 8/2001 | Martin et al. |
| 6,334,160 B1 | 12/2001 | Emmert et al. |
| 6,434,637 B1 | 8/2002 | D'errico |
| 6,478,625 B2 | 11/2002 | Tolmie et al. |
| 6,536,670 B1 | 3/2003 | Postman et al. |
| 6,542,954 B1 | 4/2003 | Aruga |
| 6,549,966 B1 | 4/2003 | Dickens et al. |
| 6,588,938 B1 | 7/2003 | Lampert et al. |
| 6,751,238 B1 | 6/2004 | Lipp et al. |
| 6,783,283 B2 | 8/2004 | Nishita |
| 6,839,771 B1 | 1/2005 | Bouchier et al. |
| 6,886,057 B2 | 4/2005 | Brewer et al. |
| 7,002,996 B1 | 2/2006 | Dougherty et al. |
| 7,023,356 B2 | 4/2006 | Burkhardt et al. |
| 7,068,603 B2 | 6/2006 | Rashid et al. |
| 7,069,369 B2 | 6/2006 | Chou et al. |
| 7,081,023 B2 | 7/2006 | Zhang et al. |
| 7,095,927 B2 | 8/2006 | Yamada et al. |
| 7,171,505 B2 | 1/2007 | Kulmann et al. |
| 7,184,440 B1 | 2/2007 | Sterne et al. |
| 7,219,846 B2 | 5/2007 | Kuo et al. |
| 7,239,642 B1 | 7/2007 | Chinn et al. |
| 7,254,650 B2 | 8/2007 | Lin et al. |
| 7,283,481 B2 | 10/2007 | Huff |
| 7,320,080 B2 * | 1/2008 | Solomon .............. H04L 29/06 370/395.1 |
| 7,330,468 B1 | 2/2008 | Tse-Au |
| 7,401,213 B2 | 7/2008 | Tateyama et al. |
| 7,412,544 B2 | 8/2008 | Gibson et al. |
| 7,437,738 B2 | 10/2008 | Shah et al. |
| 7,505,457 B2 | 3/2009 | Yamazaki |
| 7,587,536 B2 | 9/2009 | McLeod |
| 7,624,222 B2 | 11/2009 | Nanda et al. |
| 7,646,981 B2 | 1/2010 | Coffey |
| 7,677,813 B2 | 3/2010 | Anrig et al. |
| 7,711,870 B2 | 5/2010 | Yoshida et al. |
| 7,729,617 B2 | 6/2010 | Sheth et al. |
| 7,734,172 B2 | 6/2010 | Tse-Au |
| 7,886,165 B2 * | 2/2011 | Khan .................. G06F 1/3209 713/300 |
| 7,929,565 B2 | 4/2011 | Winter |
| 8,051,217 B2 | 11/2011 | Goodart et al. |
| 8,078,894 B1 | 12/2011 | Ogami |
| 8,121,139 B2 | 2/2012 | Sunaga et al. |
| 8,176,214 B2 | 5/2012 | Jones et al. |
| 8,275,914 B2 | 9/2012 | Kim et al. |
| 8,301,822 B2 | 10/2012 | Pinto et al. |
| 8,478,912 B2 | 7/2013 | Liu et al. |
| 8,533,380 B2 | 9/2013 | Chang |
| 8,578,191 B2 * | 11/2013 | Aybay .................. G06F 1/3206 370/351 |
| 8,775,713 B2 | 7/2014 | Chandra et al. |
| 8,782,321 B2 | 7/2014 | Harriman et al. |
| 9,396,151 B2 | 7/2016 | Harriman et al. |
| 9,430,435 B2 | 8/2016 | Chandra et al. |
| 2002/0049862 A1 | 4/2002 | Gladney et al. |
| 2003/0126319 A1 | 7/2003 | Adusumilli et al. |
| 2004/0246996 A1 | 12/2004 | Engel |
| 2005/0086549 A1 | 4/2005 | Solomon et al. |
| 2005/0262269 A1 | 11/2005 | Pike |
| 2005/0281286 A1 | 12/2005 | Wang et al. |
| 2006/0064522 A1 | 3/2006 | Weigold et al. |
| 2006/0203851 A1 | 9/2006 | Eidson |
| 2006/0206655 A1 | 9/2006 | Chappell et al. |
| 2007/0005867 A1 | 1/2007 | Diamant |
| 2007/0086363 A1 | 4/2007 | Wakumoto et al. |
| 2007/0249193 A1 | 10/2007 | Penumatcha et al. |
| 2008/0013569 A1 | 1/2008 | Boren |
| 2008/0025289 A1 | 1/2008 | Kapur et al. |
| 2008/0069150 A1 | 3/2008 | Badt et al. |
| 2008/0150645 A1 | 6/2008 | McCorquodale et al. |
| 2008/0155130 A1 | 6/2008 | Mosek |
| 2009/0106430 A1 | 4/2009 | Matters et al. |
| 2009/0172185 A1 | 7/2009 | Chandra et al. |
| 2010/0014541 A1 | 1/2010 | Harriman |
| 2010/0049885 A1 | 2/2010 | Chandra et al. |
| 2010/0070659 A1 | 3/2010 | Ma et al. |
| 2010/0085989 A1 | 4/2010 | Belhadj et al. |
| 2010/0135314 A1 | 6/2010 | Fourcand |
| 2010/0211834 A1 | 8/2010 | Asnaashari et al. |
| 2010/0215055 A1 | 8/2010 | Glaser |
| 2011/0052199 A1 | 3/2011 | Beshai |
| 2011/0055611 A1 | 3/2011 | Sharma et al. |
| 2011/0182274 A1 | 7/2011 | Lam et al. |
| 2011/0294359 A1 | 12/2011 | Cho et al. |
| 2012/0265911 A1 | 10/2012 | Connolly |
| 2013/0166798 A1 | 6/2013 | Chandra et al. |
| 2013/0166813 A1 | 6/2013 | Chandra et al. |

FOREIGN PATENT DOCUMENTS

| | | |
|---|---|---|
| JP | 08-316914 A | 11/1996 |
| JP | 10-233820 A | 9/1998 |
| JP | 10-243016 A | 9/1998 |
| JP | 2001-168380 A | 6/2001 |
| JP | 2001-358733 A | 12/2001 |
| JP | 2002-190344 A | 7/2002 |
| JP | 2002-318725 A | 10/2002 |
| JP | 2003-244217 A | 8/2003 |
| JP | 2004-274703 A | 9/2004 |
| JP | 2006-115362 A | 4/2006 |
| JP | 2006-245894 A | 9/2006 |
| KR | 10-2001-0076079 A | 8/2001 |
| TW | I249313 B | 2/2006 |
| WO | 2009039034 A1 | 3/2009 |
| WO | 2009-085494 A1 | 7/2009 |
| WO | 2010-021844 A1 | 2/2010 |

OTHER PUBLICATIONS

International Preliminary Report on Patentability for International Application No. PCT/US2008/084621, mailed on Jul. 8, 2010.
International Search Report/Written Opinion for International Application No. PCT/US2009/052831, mailed on Mar. 15, 2010.
International Preliminary Report on Patentability and Written Opinion received for International Application No. PCT/US2009/052831, Mailed on Mar. 3, 2011.
Office Action for Taiwan Application No. 97147418, mailed Jun. 14, 2012.
Search Report for European Application No. 09808593.9, mailed on Aug. 19, 2011.
Office Action for European Application No. 09808593.9, mailed Sep. 13, 2011.
Search Report for European Application No. 08868735.5, mailed on Sep. 2, 2011.
Office Action for European Application No. 08868735.5, mailed on mailed Sep. 29, 2011.
Office Action for Korean Application No. 10-2010-7016587, mailed Jul. 11, 2011.
Office Action for Korean Application No. 10-2010-7016587, mailed Apr. 26, 2012.
Office Action for Japanese Application No. 2010-540703, mailed Nov. 22, 2011.

(56) References Cited

OTHER PUBLICATIONS

Office Action for Chinese Application No. 200880122959.5, mailed Mar. 19, 2012.
International Preliminary Report on Patentability for PCT/US2009/052831, mailed Mar. 3, 2011.
International Search Report & Written Opinion for PCT/US2012/067438 mailed Mar. 11, 2013.
International Search Report & Written Opinion for PCT/US2012/067439, mailed Mar. 5, 2013.
International Search Report & Written Opinion for PCT/US2012/067393 mailed Mar. 8, 2013.
Non-final Office Action for U.S. Appl. No. 12/229,453 mailed Jun. 23, 2010.
Non-final Office Action for U.S. Appl. No. 11/964,666 mailed Aug. 11, 2010.
Non-final Office Action for U.S. Appl. No. 12/229,453 mailed Dec. 29, 2010.
Final Office Action for U.S. Appl. No. 11/964,666 mailed Jan. 24, 2011.
Non-final Office Action for U.S. Appl. No. 12/229,453 mailed Jun. 15, 2011.
Final Office Action for U.S. Appl. No. 12/229,453 mailed Nov. 7, 2011.
Non-final Office Action for U.S. Appl. No. 12/229,453 mailed Mar. 28, 2012.
Final Office Action for U.S. Appl. No. 12/229,453 mailed Oct. 10, 2012.
Notice of Allowability for U.S. Appl. No. 11/964,666 mailed Nov. 23, 2012.
Advisory Action for U.S. Appl. No. 12/229,453 mailed Dec. 13, 2012.
Notice of Allowability for U.S. Appl. No. 11/964,666 mailed Apr. 12, 2012.
Office Action and Search Report issued for Taiwan Application No. 97147418, mailed Nov. 22, 2012.
Search Report for Taiwan Application No. 98127253, mailed Nov. 8, 2012.
Office Action for Korean Application No. 10-2011-7003986, mailed Jul. 18, 2012.
Office Action for JP 2011-523856, mailed Mar. 12, 2013.
Office Action for Chinese Application No. 200880122959.5, mailed Dec. 3, 2012.
Office Action for European Application No. 08868735.5, mailed Sep. 29, 2011.
International Search Report & Written Opinion for PCT/US2013/033533, mailed Jul. 23, 2013.
Non-Final Office Action for U.S. Appl. No. 12/229,453, mailed Jun. 28, 2013.
Non-Final Office Action for U.S. Appl. No. 13/338,236, mailed Jul. 1, 2013.
Third Office Action for CN Application No. 200880122959.5 mailed Mar. 27, 2013.
Office Action for CN200980136965.0 mailed Apr. 27, 2013.
Office Action mailed Feb. 5, 2014 for Korean Application No. 2013-0014284, 3 pages.
Office Action mailed Jan. 13, 2014 for Chinese Application No. 200980136965.0, 15 pages.
International Preliminary Report on Patentability for PCT Application No. PCT/US2013/033533, dated Oct. 9, 2014, 6 pages.
International Search Report and Written Opinion mailed Mar. 5, 2013 for International Application No. PCT/US2012/067439, 10 pages.
International Preliminary Report on Patentability mailed Jul. 10, 2014 for International Application No. PCT/US2012/067439, 4 pages.
Non-Final Office Action mailed Nov. 29, 2013 for U.S. Appl. No. 13/338,227, 29 pages.
Notice of Allowance mailed Feb. 28, 2014 for U.S. Appl. No. 13/338,227, 5 pages.
Notice of Allowance mailed Apr. 29, 2014 for U.S. Appl. No. 13/338,227, 6 pages.
Non-Final Office Action mailed Dec. 11, 2015 for U.S. Appl. No. 14/282,885, 23 pages.
Final Office Action mailed Mar. 16, 2016 for U.S. Appl. No. 14/282,885, 8 pages.
Notice of Allowance mailed May 4, 2016 for U.S. Appl. No. 14/282,885, 10 pages.
Non-Final Office Action mailed Dec. 31, 2013 for U.S. Appl. No. 13/369,140, 27 pages.
Notice of Allowance mailed Mar. 10, 2014 for U.S. Appl. No. 13/369,140, 5 pages.
Non-Final Office Action mailed Nov. 23, 2015 for U.S. Appl. No. 14/301,100, 22 pages.
Notice of Allowance mailed Mar. 30, 2016 for U.S. Appl. No. 14/301,100, 5 pages.
Notice of Allowance mailed Jul. 7, 2014 for U.S. Appl. No. 13/434,782, 34 pages.
Office Action mailed Apr. 28, 2015 for Japanese Patent Application No. 2014-550305, 3 pages.
David J. Harriman et al., "PCI Express Tunneling Over a Multi-Protocol I/O Interconnect", U.S. Appl. No. 15/005,279, filed Jan. 25, 2016, 61 pages.
Office Action mailed Jan. 24, 2017 for Japanese Patent Application No. 2016-017279, 6 pages.

\* cited by examiner

LINK POWER MANAGEMENT IN AN I/O INTERCONNECT

CROSS REFERENCE TO RELATED APPLICATION

The present application is a continuation of U.S. patent application Ser. No. 13/434,782, filed Mar. 29, 2012, entitled "LINK POWER MANAGEMENT IN AN I/O INTERCONNECT," the entire disclosure of which is hereby incorporated by reference in its entirety.

TECHNICAL FIELD

Embodiments of the present disclosure relate generally to power management in an I/O interconnect of a computer apparatus.

BACKGROUND

Conventional computer platform architectures may include hierarchical serialized link interconnect solutions (e.g., PCI Express and USB), which may include a variety of host controllers to separately implement a number of different types of I/O between computer platforms and peripheral devices that are connected to the platforms. These computer platforms generally include protocol-specific connection interfaces that connect to the peripheral devices via protocol-specific plugs and cables. For example, a computer may include one or more of a USB-specific controller that connects to a peripheral device via a USB-specific connection interface, a display-specific controller (e.g., DisplayPort) that connects to a peripheral device via a display-specific connection interface, a PCI express (PCIe)-controller that connects to a peripheral device via a PCIe-specific connection interface, and so on.

Some computer platform architectures may include, in addition to hierarchical interconnect solutions, non-hierarchical interconnect solutions where serialized links connected via a switching fabric enable establishing multiple, autonomous data streams between peer controllers. Effective system management over links in a non-hierarchical solution, such as power management of individual links, may be complicated by the lack of having the primary I/O controller typical of hierarchical solutions.

BRIEF DESCRIPTION OF THE DRAWINGS

Embodiments of the present disclosure will be described by way of example embodiments, but not limitations, illustrated in the accompanying drawings in which like references denote similar elements, and in which.

DETAILED DESCRIPTION

Described herein are systems and methods of power management in an I/O interconnect of a computer apparatus.

In the following description, various aspects of the illustrative implementations will be described using terms commonly employed by those skilled in the art to convey the substance of their work to others skilled in the art. It will be apparent to those skilled in the art, however, that embodiments of the present invention may be practiced with only some of the described aspects. For purposes of explanation, specific numbers, materials and configurations are set forth in order to provide a thorough understanding of the illustrative implementations. It will be apparent to one skilled in the art, however, that the present invention may be practiced without the specific details. In other instances, well-known features are omitted or simplified in order not to obscure the illustrative implementations.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Various entities may be introduced and described with respect to the operations they perform. It will be understood that these entities may include hardware, software, and/or firmware elements that are cooperatively configured to provide the described operations.

Figure 1:
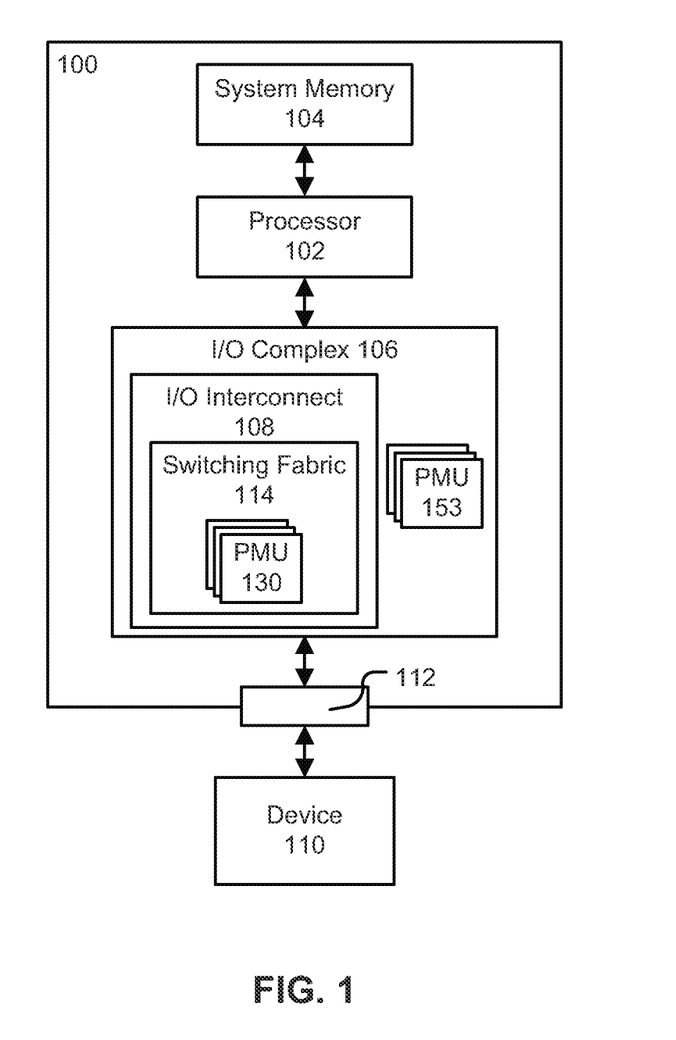
FIG. 1 describes a computer apparatus including a switching fabric of an I/O interconnect having one or more power management units, in accordance with various embodiments of the present disclosure.

FIG. 1 describes a computer apparatus 100 including an I/O interconnect 108 in accordance with various embodiments. In many embodiments, the computer apparatus 100 may include one or more processors 102. In different embodiments, the one or more processors 102 may include one core or multiple cores. In some embodiments, the apparatus 100 may be a multiprocessor system (not shown) where each of the processors has one core or multiple cores.

As shown in FIG. 1, the one or more processors 102 may be operatively coupled to system memory 104 through one or more links (e.g., interconnects, buses, etc). System memory 104 may be capable of storing information that the one or more processors 100 utilize to operate and execute programs and operating systems. In different embodiments, system memory 104 may be any usable type of readable and writeable memory such as a form of dynamic random access memory (DRAM).

In the computer apparatus as described in the embodiment shown in FIG. 1, the one or more processors 102 may be operatively coupled to an I/O complex 106, which may house one or more I/O interconnects 108 configured to control one or more I/O links that allow the one or more processors 102 to communicate with one or more I/O peripheral devices 110. The I/O interconnect 108 may include a switching fabric 114 configured to simultaneously transport multiple I/O data streams. In various embodiments, the switching fabric 114 may comprise a plurality of crossbar switches. Examples of I/O peripheral devices 110 may include, but are not limited to, a display device, a keyboard device, an expansion port, a desktop or mobile computer system, or a router, among other devices.

The computer apparatus 100 may include a distribution of power management units 130, 153, which may be configured to automatically optimize the link power management states of the I/O links through the switching fabric 114. In various embodiments, the power management units 130 may comprise firmware or hardware disposed in the switches of the switching fabric 114. In various embodiments, additional power management units 153 may reside in applications such as hardware, firmware, or software external to the I/O interconnect 108. In various embodiments, for example, additional power management unit(s) may reside in a protocol controller, a peripheral device, a driver, as part of a system BIOS, within an operating system running on the computer apparatus, etc., which may be responsible for application-driven power management decisions and the control of the I/O links over which each connects to the I/O interconnect 108. The distributed power management units 130 residing in the switching fabric may be responsible for individual I/O link power management entry/exit decisions based on observing power management behavior for all of the I/O links directly visible to individual power management units 130 and may propagate decisions made within one power management unit 130 of a switch to propagate to a power management unit 130 of another switch.

In various embodiments, the I/O interconnect 108 be configured to provide multi-protocol transporting capability, in which the data streams of different protocols may be transported simultaneously. In previously implemented computer apparatuses, an I/O link connecting a peripheral device to a computer system is protocol-specific with a protocol-specific connector port that allows a compatible peripheral device to be attached to the protocol-specific connector port (i.e., a USB keyboard device would be plugged into a USB port, a router device would be plugged into a LAN/Ethernet port, etc.) with a protocol-specific cable. Any single connector port would be limited to peripheral devices with a compatible plug and compatible protocol. Once a compatible peripheral device is plugged into the connector port, a communication link would be established between the peripheral device and a protocol-specific controller. For providing the multi-protocol capability of various embodiments, at least in part, the switching fabric 114 may be configured to simultaneously carry multiple I/O protocol data streams.

A connector port 112 may be configured to couple the I/O interconnect 108 with a connector port (not shown) of the device(s) 110, allowing devices 110 to attach to the computer system 100 through the physical connector port 112. In various embodiments, the connector port 112 may be protocol-specific. In other embodiments, the connector port 112 may be non-protocol-specific such that an I/O link between the device(s) 110 and the I/O complex 106 may be configured to carry multiple I/O protocols (e.g., PCIe, USB, DisplayPort, HDMI®, etc.) simultaneously. In various embodiments, the connector port 112 may be capable of providing the full bandwidth of the link in both directions with no sharing of bandwidth between ports or between upstream and downstream directions. In various embodiments, the connection between the I/O interconnect 108 and the device 110 may support electrical connections, optical connections, or both.

Figure 2:
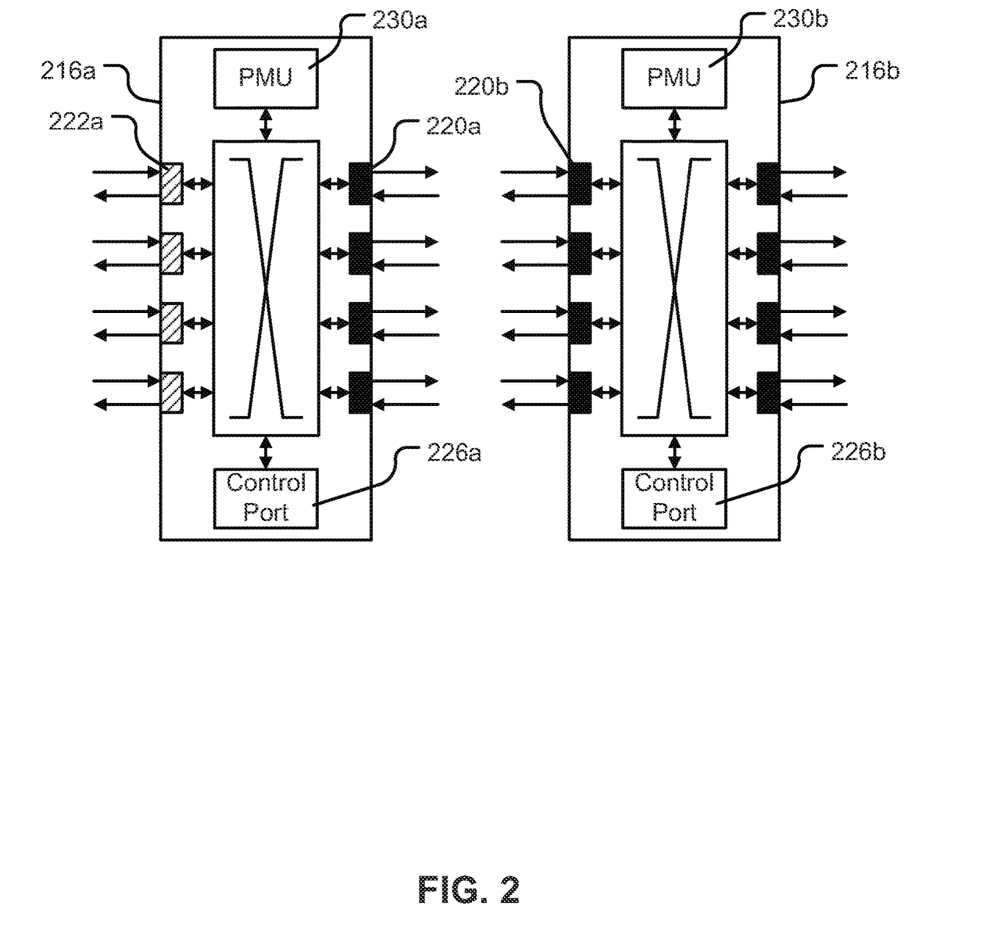
FIG. 2 describes switches including power management units, in accordance with various embodiments of the present disclosure.

Example switches 216a, 216b for a switching fabric are shown in FIG. 2. The switches 216a, 216b may provide an I/O interconnect capability to simultaneously carrying multiple I/O data streams. The switches 216a, 216b may be similar to other switches described herein. In general, the switches 216a, 216b are devices comprising multiple ports 220s, 220b, 222a with the ability to route a packet from any input port to any output port. In various embodiments, the switches 216a, 216b may comprise any number of ports 220s, 220b, 222a, with each additionally including an internal control port 226a, 226b. The switches 216a, 216b may each include a power management unit 230a, 230b for power management of the switching fabric 214.

Switch 216a may represent a first type of switch including linking ports 220a configured to connect to a single optical or electrical link, while adapter ports 222a may be configured to connect to one or more mapped I/O protocol links. The adapter ports 222a may be used to connect mapped I/O protocol entities to a switching fabric including the switch 216a. As used herein, the term "adapter" may be used to refer to the protocol adaptation function that may be built into the switch port to encapsulate the mapped I/O protocol packets into I/O packets that flow over a switching fabric.

Switch 216b may represent a second type of switch including only linking ports 220b (like linking ports 220a) configured to connect to a single optical or electrical link.

Although the switches 216a, 216b depicted in FIG. 2 each include four adapter ports 222a and four linking ports 220a, 220b, the actual number of ports 220a, 220b, 222a may be fewer or more than that shown. In order to provide connectivity between switches 216a, 216b, a switch implementation generally minimally includes either at least one linking port and at least one adapter port, or at least two linking ports.

In various embodiments, the switching fabric 214 may comprise one or more of the first type of switches 216a and one or more of the second type of switches 216b.

For implementing simultaneous transporting of separate data streams between adapter ports of a switching fabric within the scope of the present disclosure, a connection manager (not illustrated) may be provided. The connection manager may be implemented in software, firmware, as logic within the I/O complex, as part of a system BIOS, or within an operating system running on a computer apparatus or system in which the I/O complex is included.

Figure 3:
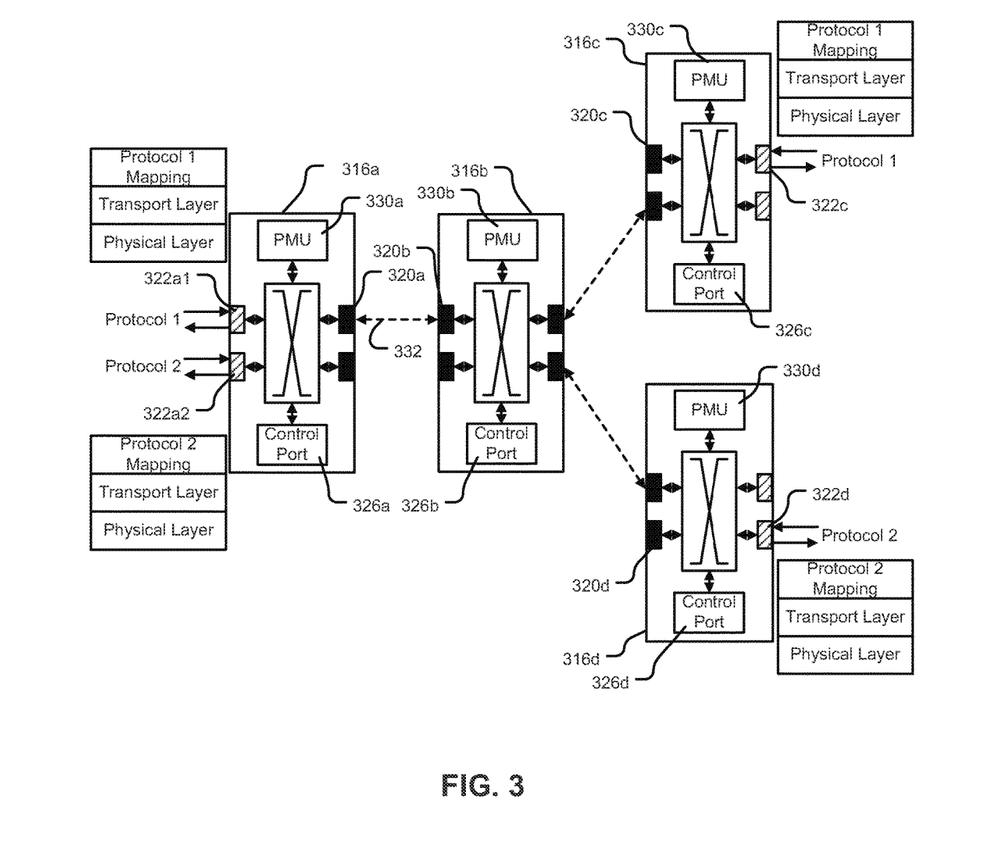
FIG. 3 describes an implementation of data transport over a switching fabric, in accordance with various embodiments of the present disclosure.

An example implementation of transporting data streams over a switching fabric is shown in FIG. 3. In the example shown, two protocols are implemented using switches 316a, 316b, 316c, 316d. Each of the switches 316a, 316b, 316c, 316d include control ports 326a, 326b, 326c, 326d, and power management units 330a, 330b, 330c, 330d. In various embodiments, the protocols may be the same protocol or may be different protocols.

As shown, the adapter ports 322a1, 322c implement a first protocol layer (or frame layer) "protocol 1," and adapter ports 322a2, 322d implement a second protocol layer (or frame layer) "protocol 2." All ports implement the transport layer, while the physical layer is implemented by all linking ports 320a, 320b, 320c, 320d.

As such, an I/O link (e.g., link 332) between ports of switches may effectively be shared by multiple I/O paths traversing the switching fabric between adapter ports of the switching fabric. In various embodiments, the I/O interconnect may be connection-oriented such that an I/O path is configured end-to-end before data transfer takes place. The I/O path may traverse one or more links through the switching fabric, and each hop, the I/O path may be assigned a locally unique identifier (e.g., Hop ID) that may be carried in the header of all the packets that are associated with the I/O path. In various embodiments, packets belonging to the I/O path may not be reordered within the switching fabric. Buffer allocation (flow control) and Quality of Service may be implemented on a per-path basis. As such, an I/O path may provide virtual-wire semantics for a mapped I/O protocol across the switching fabric.

Figure 4:
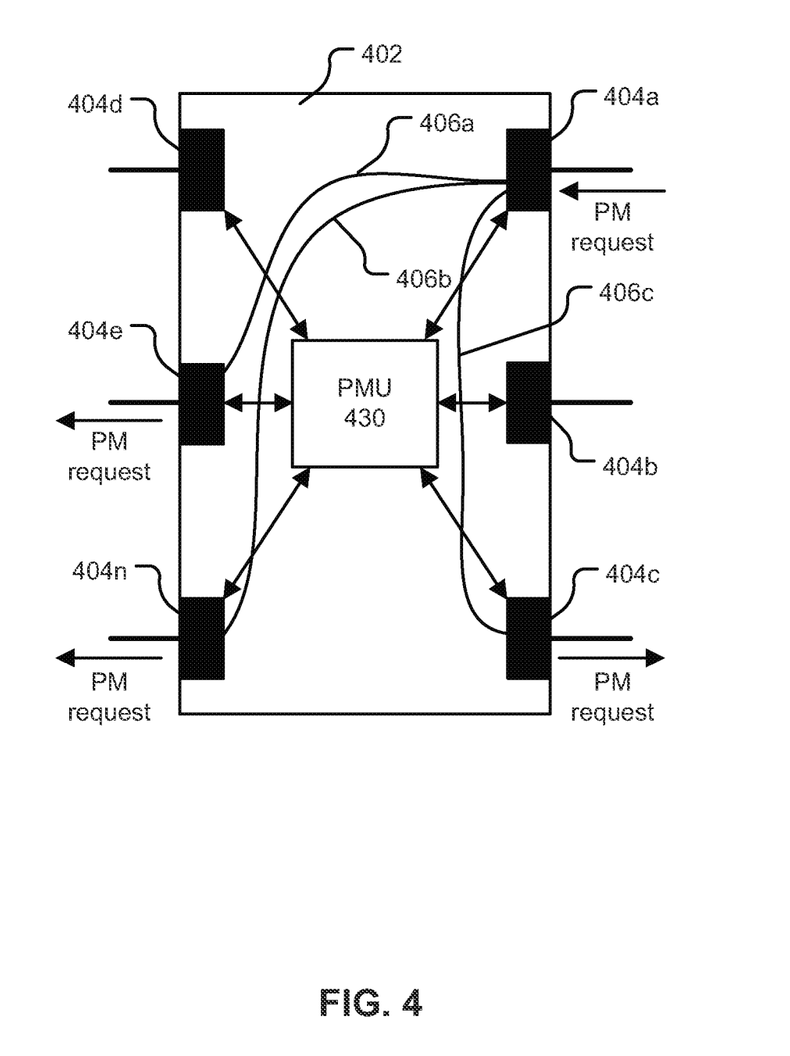
FIG. 4 describes a switch including a power management unit, in accordance with various embodiments of the present disclosure.

Another example switch 402 of an I/O interconnect switching fabric is shown in FIG. 4. The switch 402 may include multiple ports 404a, 404b, 404c, 404d, ... 404n, and a power management unit 430 for power management of the I/O interconnect switching fabric. The switch 402 may be similarly configured to the switches described herein.

The power management unit 430 may be configured to facilitate decision-making regarding power management change propagation along the I/O paths 406a, 406b, 406c. To that end, the power management unit 430 may be configured to modify the ports 404a, 404b, 404c, 404d, ... 404n between multiple link power management states (referred to herein as "power states"), which may be defined and adapted to trade exit latency for power savings. The multiple power states may support the various possible power-down modes for the I/O links (e.g., the electrical and optical portions of the links). In various embodiments, power states may include one or more active, idle, suspend, or default power states. As used herein, for example, power states may include one or more of L0 link state (active), L0s link state (half idle), L1 link state (full idle), L2 link state (suspend), or Ld link state (default). In various ones of these embodiments, the relative link power of the states may be L0>L0s>L1>L2>Ld. It is noted that various power states are applicable across various I/O protocols and terms such as L0, L1, etc., may vary by protocol. For example, L0 may be a term used for PCIe and may be similar to the U0 power state for USB.

The power management unit 430 may be configured to automatically modify the power states of ports 404a, 404b, 404c, 404d, 404e, ... 404n to the deepest (e.g., most idle) of the power states possible based on observing the deepest acceptable power state of the ports 404a, 404b, 404c, 404d, ... 404n. As shown, ports 404a, 404c, 404e, 404n are configured to transport one or more I/O paths 406a, 406b, 406c, and the power states of the ports 404a, 404c, 404e, 404n may be modified by the power management unit 430 based at least in part on the relative power states of the I/O paths 406a, 406b, 406c. In this example, therefore, the power management unit 430 may modify the power state of port 404a based at least in part on the relative power states of the I/O paths 406a, 406b, 406c. In various embodiments, the power management unit 430 may modify the power state of port 404a to a higher one of the power states of the I/O paths 406a, 406b, 406c. In other words, the higher level powers states have priority over the lower level power states.

In various embodiments, the power management unit 430 may propagate power state modification to one or more other ports of the switch 402. For the embodiment depicted by FIG. 4, the power management unit 430 may modify the power state of port 404c based on the power state of I/O path 406c. Likewise, the power management unit 430 may modify the power state of port 404n based on the power state of I/O path 406b, and the power state of port 404e based on the power state of I/O path 406a.

In various embodiments, the power management unit 430 may be configured to modify the power states of ports 404b, 404d, configured with no I/O links as shown, to the deepest (e.g., most idle) of the power states possible due at least in part to the fact that the ports 404b, 404d are not currently being used for data packet transport.

The power management unit 430 may be configured to make power management decisions based on the observed behavior and knowledge of the I/O paths that have been configured to pass through the switch 402. In various ones of these embodiments, the power management unit 430 may be configured to initiate exit out of an idle power state (or less than active power state) back to the active state based on having data packets queued up to transfer. Similarly, in various embodiments, the power management unit 430 may be configured to initiate entry to an idle power state (or less than active power state) based on having no data packets queued up to transfer The power management unit 430 may be configured to monitor the ports 404 for power management requests to modify a power state of a port, modify the power state of a port based on the power management requests. In various embodiments, the power management unit 430 may monitor the ports 404 on a regularly recurring cadence for power management requests. In other embodiments, the power management unit 430 may nominally standby to make decisions only as needed by a change in power state at any of the individual ports 406. In various embodiments, the power management unit 430 may make power management decisions based, at least in part, on a power management request initiated by an application and flowing through the I/O interconnect. As noted earlier, applications may include, but are not limited to, hardware, firmware, or software at the edges of the I/O interconnect such as, for example, a protocol controller, a peripheral device, a driver, as part of a system BIOS, within an operating system running on the computer apparatus, etc.

Figure 5A:
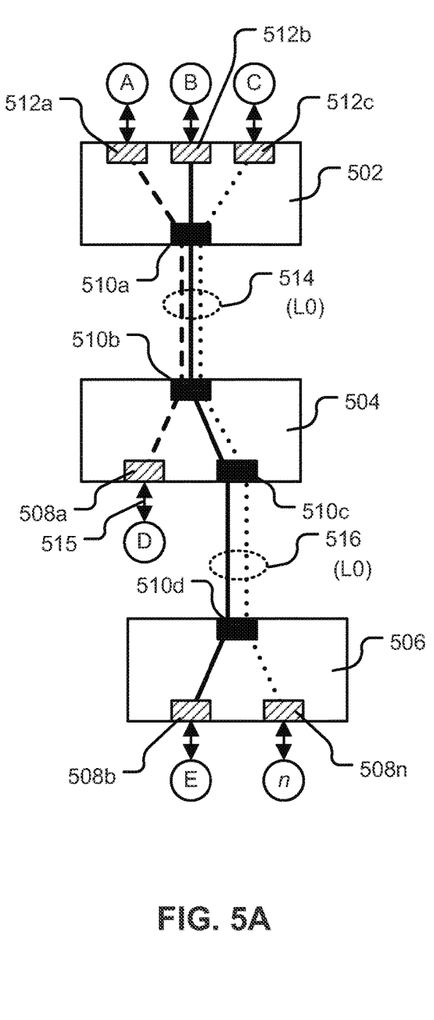
FIG. 5A and FIG. 5B describe upstream/downstream adapter port connections of a switching fabric having power management units, in accordance with various embodiments of the present disclosure.
Figure 5B:
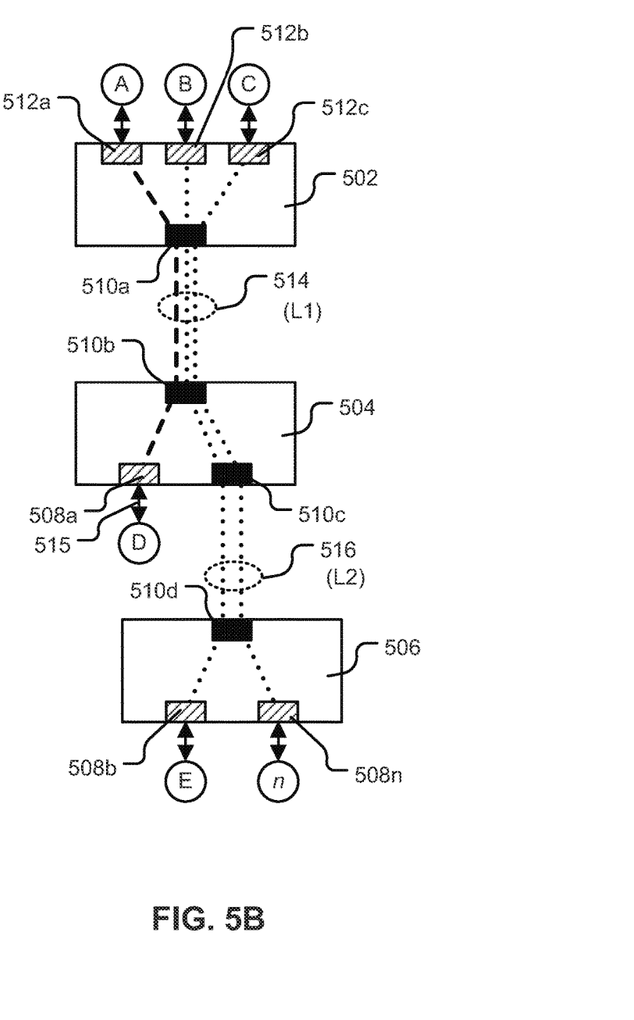

FIG. 5A and FIG. 5B describe simplified examples of upstream/downstream adapter port connections of an I/O interconnect in accordance with various embodiments described herein. As shown, entities A, B, C, D, E, ... n, one or more of which may include a power management unit, may be interconnected via switches 502, 504, 506, each of which may also include a power management unit.

The I/O interconnect includes three downstream mapped adapters 508a, 508b, . . . 508n paired, via one or more linking ports 510a, 510b, 510c, 510d, with three upstream adapters 512a, 512b, 512c. For a clearer understanding of the depicted example, adapter ports 508a, 508b, . . . 508n and 512a, 512b, 512c are shown as cross-hatched, while linking ports 510a, 510b, 510c, 510d are shown as solid black. In addition, for the depicted examples, various power states are indicated by various line types including a solid line (L0), a hashed line (L1-equivalent), and a dotted line (L2-equivalent).

The one or more of entities A, B, C, D, E, . . . n may be other switches or applications external to the switching fabric, one or more of which may include respective power management units. Applications may include, but are not limited to, for example, a protocol controller, a peripheral device, a driver, part of a system BIOS, within an operating system running on the computer apparatus, etc. In some embodiments, for example, switch 502 may be operatively coupled to entity A, which may comprise a first protocol controller with a power management unit, and the switch 502 may be further operatively coupled to entity B, which may comprise a second protocol controller with a power management unit such that the switch 502 is configured to simultaneously transport data packets of the first protocol from the first protocol controller and data packets of the second protocol from the second protocol controller. The I/O path between the first protocol controller (e.g., entity A) and switch 504, therefore, may be configured to connect port 510b of switch 504 with the first protocol controller, via the switch 502. Likewise, the I/O path between the second protocol controller (e.g., entity B) and switch 504, therefore, may be configured to connect port 510b of switch 504 with the second protocol controller, via the switch 502. In various ones of these embodiments, the first protocol controller (e.g., entity A) may use a first protocol and the second protocol controller (e.g., entity B) may use a second protocol, wherein the second protocol is different from the first protocol.

In another example, entity D may comprise another switch. In this example, data packets may be transported over an I/O path of another I/O link 515 between port 508a of the switch 504 and a port (not illustrated) of the other switch (e.g., entity D).

Those skilled in the art will understand that many other configurations and implementations, in addition to the examples described herein, are possible within the scope of the present disclosure.

Returning to FIG. 5A, as shown, both of the links 514, 516 remain in power states L0 given that the configured data I/O path between the B and E is active (L0), which is a higher power state than the L1-equivalent power state of the configured data I/O path between A and D, and the L2-equivalent power state of the configured data I/O path between C and n.

As one or more of the configured I/O paths change power states, the links 514, 516 may correspondingly change power states. As shown in FIG. 5B, the I/O path between B and E subsequently goes into an L2-equivalent idle state. In response, a power management unit of switch 502 may modify a power state of port 510a based at least in part on the relative power states of the I/O paths of the link 514, and a power management unit of switch 504 may propagate the modification by modifying a power state of port 510b based at least in part on the relative power states of the I/O paths of the link 514. The power management unit of switch 504 may also propagate the modification by modifying a power state of port 510c based at least in part on the relative power states of the I/O paths of the link 516, and a power management unit of switch 506 may propagate the modification by modifying a power state of port 510d based at least in part on the relative power states of the I/O paths of the link 516. In this example, each of the links 514, 516 drops into a deeper power state, with the upper link 514 limited to going to the L1-equivalent power state given the I/O path between A and D still being in the L1-equivalent power state while the lower link 516 can drop into the L2-equivalent power state given that both the I/O path between B and E and the I/O path between C and n are now in the L2-equivalent power state.

Returning the links 514 and/or 516 to an active state (L0) may operate similarly to power management entry. In various embodiments, the application endpoint may drive its local link into the active power state, which may be propagated through the I/O interconnect based on I/O path configurations. To keep from re-activating an I/O path that shares a link but is not the target of the data packet flow, the power management unit of a switch may monitor its ports for power management requests including power management message information such as the intended I/O path of the forthcoming data or may simply wait for data to appear across the link and draw the necessary routing information from the data headers to determine which of the configured I/O paths to propagate the re-activation. In various embodiments, determining which I/O paths to re-activate based on power management message information may reduce the amount of time needed to propagate the power management decisions.

In various embodiments, propagation direction of power states may not be required to follow a specific directional order. For various ones of these embodiments, applications may simply always push power management requests (to change a power state) into the I/O interconnect, and the switches may reflect these power management requests along all applicable configured I/O paths for a given initiating application until such time as a conflict with another application sharing a given I/O link arises. In various embodiments, the applications may make link power management decisions independently and the interactions across the switching fabric may proceed transparently to the applications by the power management units internal to the switches. In other words, the applications may be responsible only for their local I/O link to the I/O interconnect and may simply drive the link power management decisions by actively striving for the lowest power state while still being able to maintain application responsiveness.

Figure 6:
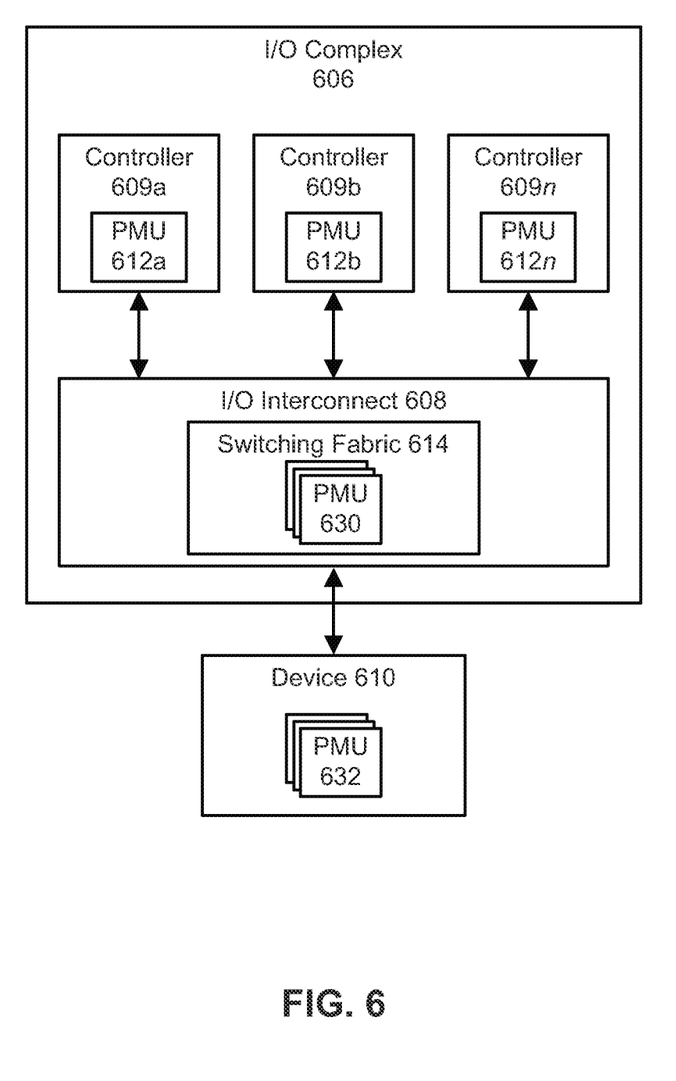
FIG. 6 describes an I/O complex coupled with a peripheral device, in accordance with various embodiments of the present disclosure.

As discussed herein, power management units may reside in switches of a switching fabric and, in some embodiments, may also reside in applications at the edges of an I/O interconnect. FIG. 6 shows an example I/O complex 606 having a switching fabric 614 including one or more power management unit(s) 630, one or more controllers 609a, 609b, . . . 609n including power management units 612a, 612b, . . . 612n, and a peripheral device 610 including one or more power management unit(s) 632, in accordance with various embodiments. The I/O complex 606 may be similar to the I/O complex 106 of FIG. 1, including an I/O interconnect 608, having the switching fabric 614, configured to couple with the device 610. The device 610 may be configured with one or more I/O protocols (e.g., PCIe, USB, DisplayPort, HDMI®, etc.).

In various embodiments, the I/O complex 606 may be configured to connect the device 610 with the one or more controllers 609a, 609b, . . . 609n via the I/O interconnect 608 in order to transport multiple I/O protocols over a common I/O link in a manner that is transparent to the OS software stacks of transported I/O protocols. The controllers 609a, 609b, . . . 609n may be configured to then communicate with respective drivers in the OS for configuring the device 610 as if the device 610 was directly connected with the controller 609a, 609b, . . . 609n. In various embodiments, the controllers 609a, 609b, . . . 609n may be protocol-specific controllers configured to communicate with respective protocol-specific drivers.

The peripheral device 610 may be any one of various types of devices configured to couple with an apparatus including the I/O complex 606. In various embodiments, the peripheral device 610 may be an expansion port. F embodiments in which the peripheral device 610 is an expansion port, the peripheral device 610 may be simultaneously coupled with a PCIe device and a DisplayPort device, which may be coupled with an I/O complex 606 through the peripheral device 610. In another example, the peripheral device 610 may be a mobile or desktop computer system and one or more other devices may be coupled with the mobile or desktop computer system and with the I/O complex 606 through the peripheral device 610. In various embodiments, multiple peripheral devices may be coupled together by daisy chaining the devices together. In various embodiments, the peripheral device 610 and/or the other devices coupled with the peripheral device 610 may also include an I/O interconnect (not illustrated) similar to one or more of the I/O interconnects described herein.

Figure 7A:
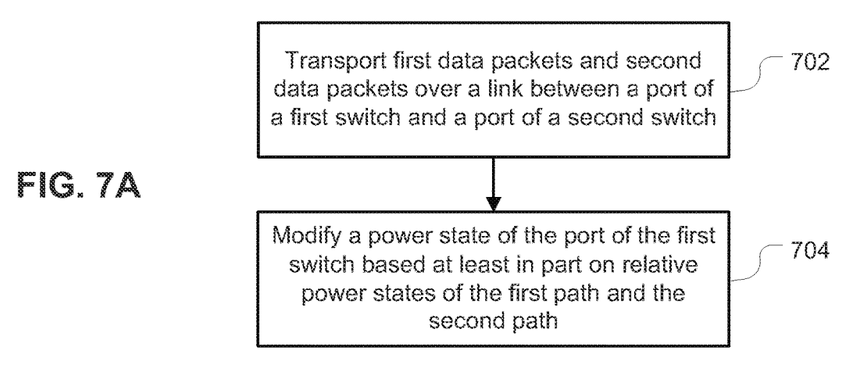
FIG. 7A and FIG. 7B are flow diagrams of methods for managing link power in an I/O interconnect, in accordance with various embodiments of the present disclosure.
Figure 7B:
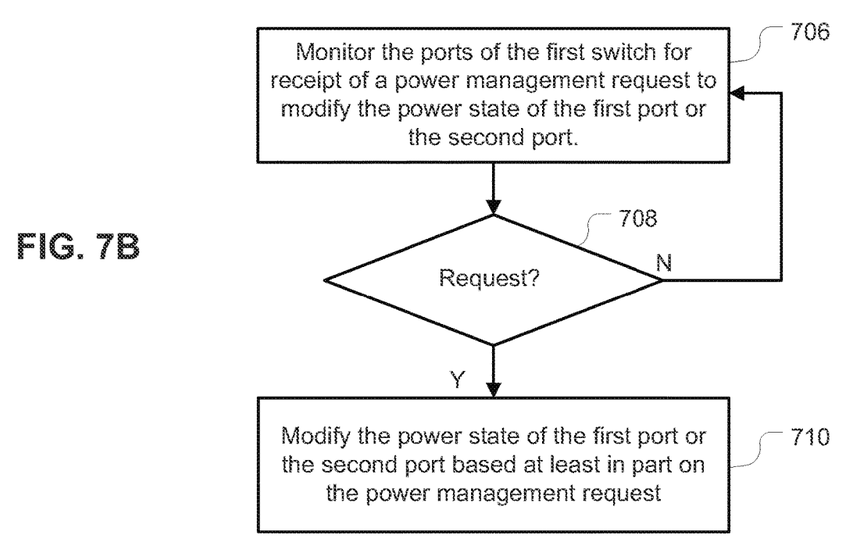

FIG. 7A and FIG. 7B are flow diagrams of example methods for managing power states of an I/O interconnect, in accordance with various embodiments of the present disclosure. In various embodiments, the method of FIG. 7A may be practiced in conjunction with the method of FIG. 7B. The methods may include one or more functions, operations, or actions as is illustrated by blocks 702, 704, 706, 708, and/or 710.

Processing for the method of FIG. 7A may start with block 702 by simultaneously transporting first data packets over a first path of a link between a port of a first switch of an I/O interconnect and a port of a second switch of the I/O interconnect and second data packets over a second path of the link. In various embodiments, the switches may be included in a switching fabric of the I/O interconnect.

Processing for the method may proceed to block 704 by modifying, by a power management unit in the first switch, a power state of the port of the first switch based at least in part on relative power states of the first path and the second path of the link. In various embodiments, modifying may comprise modifying the power state of the port of the first switch to a higher one of the power states of the first path and the second path.

In various embodiments, an operation similar to the operation of block 704 may be performed by a power management unit of the second switch. In these embodiments, the power management unit of the second switch may perform the operation of modifying a power state of the port of the second switch based at least in part on relative power states of the first path and the second path of the link. In various embodiments, modifying may comprise modifying the power state of the port of the first switch to a higher one of the power states of the first path and the second path.

In various embodiments, the method of FIG. 7B may be performed following block 704. In these embodiments, the method may proceed to block 706 by monitoring, by the power management unit in the first switch, the first and second ports of the first switch for receipt of a power management request to modify the power state of the first port or the second port of the first switch. Similarly, in various embodiments, the method may include monitoring, by the power management unit in the second switch, the first and second ports of the second switch for receipt of a power management request to modify the power state of the first port or the second port of the second switch.

The method may proceed to block 708 by receiving, by at least one of the ports of the first switch, a request to modify a power state of the port. In various embodiments, a power management request may be received by the first switch from another switch of the switching fabric or from an application external to the switching fabric. For example, a power management request may be provided from a protocol controller of a computer apparatus.

The method may proceed to block 710 by modifying, by the power management unit in the first switch, the power state of the first port or the second port based at least in part on the power management request. In various embodiments, the power state modification may be propagated to one or more other ports of the first switch.

Figure 8:
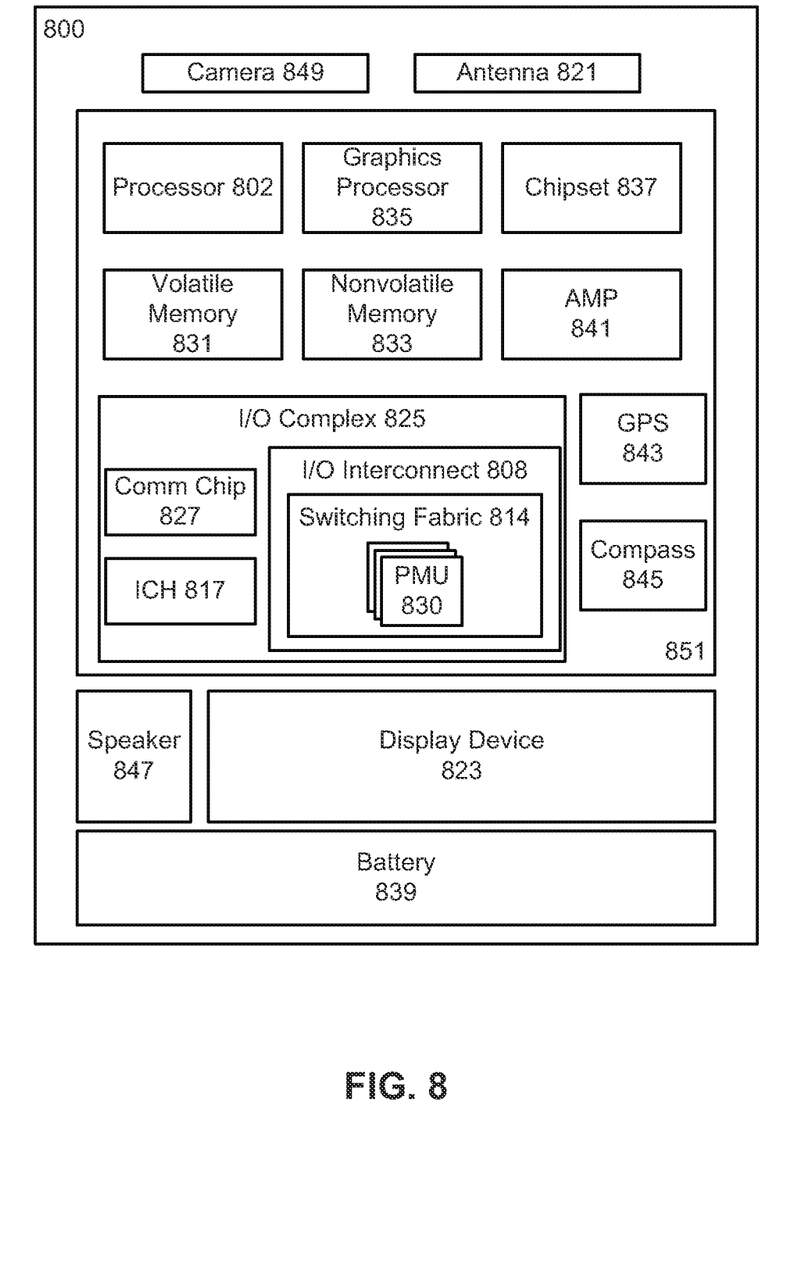
FIG. 8 is a block diagram of a computer system including an I/O interconnect, in accordance with various embodiments of the present disclosure.

Embodiments of the apparatuses described herein may be stand-alone devices or may be incorporated into various other apparatuses or systems including, but not limited to, various computing and/or consumer electronic devices/appliances. A system level block diagram of an example system 800 is illustrated in FIG. 8. In various embodiments, the system 800 may have more or fewer components, and/or different architectures than that shown in FIG. 8.

In various implementations, the system 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the system 800 may be any other electronic device that processes data.

In various embodiments, the system 800 may include a processor 802, which may be physically and electrically coupled with a motherboard 851. Depending on its applications, the system 800 may include other components that may or may not be physically and electrically coupled to the motherboard 851. These other components include, but are not limited to, volatile memory 831 (e.g., DRAM), non-volatile memory 833 (e.g., ROM), flash memory, a graphics processor 835, a digital signal processor, a crypto processor, a chipset 837, a battery 839, an audio codec, a video codec, a power amplifier 841, a global positioning system (GPS) device 843, a compass 845, an accelerometer, a gyroscope, a speaker 847, a camera 849, and a mass storage device (such as hard disk drive, compact disk (CD), digital versatile disk (DVD), and so forth).

The system 800 may include a communications cluster 825 to facilitate communication of the system 800 over one or more networks and/or with any other suitable device. The communications cluster 825 may include at least one communication chip 827 and at least one I/O controller hub 817. In some implementations, the at least one I/O controller hub 817 may be part of the at least one communication chip 827. In some implementations the at least one communication chip 827 may be part of the processor 802. The communications cluster 825 may include one or more I/O interconnects 808, each of which include a switching fabric 814 and control one or more I/O links that allow the one or more processors 802 to communicate with one or more I/O peripheral devices (not shown here). The I/O interconnect 808 may include a distribution of power management units 830, which may be configured to automatically optimize the link power management states of the I/O links through the switching fabric 814, similarly to the various embodiments described herein. Although not illustrated, one or more additional power management units may reside external to the switching fabric 814, as similarly to the various embodiments described herein (such as, for example, power management unit 153 shown in FIG. 1).

The communication chip 827 may enable wireless communications for the transfer of data to and from the system 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 827 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. The system 800 may include a plurality of communication chips 827. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The system 800 may include a display device 823, such as, for example, a cathode ray tube (CRT), liquid crystal display (LCD), light emitting diode (LED), or other suitable display device, for displaying information. The display device 823 may be a touch screen display supporting touch screen features, and in various one of these embodiments, the system 800 may include a touchscreen controller. In various embodiments, the display device 823 may be a peripheral device interconnected with the system 800.

Although various example methods, apparatus, and systems have been described herein, the scope of coverage of the present disclosure is not limited thereto. On the contrary, the present disclosure covers all methods, apparatus, and systems fairly falling within the scope of the appended claims, which are to be construed in accordance with established doctrines of claim interpretation. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus, comprising:
    a first switch of an input/output (I/O) interconnect switching fabric, to transport first data packets over a first path between a first port of the first switch and a second port of the first switch and second data packets over a second path between the first port and a third port of the first switch;
    a power management unit included in the first switch, to modify a respective power state of the first, second or third ports based at least in part on relative power states of the first and second paths; and
    a second switch to transport the first data packets between the first port of the first switch and a fourth port of the second switch over a third path.

2. The apparatus of claim 1, wherein the power management unit is to modify a power state of the first port according to a higher one of the relative power states of the first and second paths.

3. The apparatus of claim 2, wherein the power states of the first path and the second path comprise a selected one of: active state, half idle state, full idle state, suspend state, or default state, wherein the active state corresponds to a highest power state and the default state corresponds to a lowest power state.

4. The apparatus of claim 1, wherein the power states are applicable across I/O protocols corresponding to the transport of the first or second data packets.

5. The apparatus of claim 1, wherein the first data packets comprise data packets of a first I/O protocol, wherein the second data packets comprise data packets of a second I/O protocol, and wherein the second I/O protocol is different from the first I/O protocol.

6. The apparatus of claim 5, wherein the first or second I/O protocols comprise one of: Peripheral Component Interconnect Express (PCIe), Universal Serial Bus (USB), DisplayPort, or High-Definition Multimedia Interface (HDMI).

7. The apparatus of claim 1, wherein the power management unit is further to monitor the first and second ports for receipt of a power management request to modify the power state of the first port or the second port.

8. The apparatus of claim 5, wherein he power management unit is to modify the power state of the first port or the second port in response to a power management request.

9. The apparatus of claim 1, wherein the second switch includes a second power management unit to modify a power state of the fourth port of the second switch based at least in part on a power state of the third path.

10. The apparatus of claim 1, wherein the power management unit is to modify a power state of the second port according to a power state of the first path, and to modify a power state of the third port according to a power state of the second path.

11. The apparatus of claim 1, wherein the apparatus is a computing device.

12. A method comprising:
    transporting, by a first switch of an input/output (I/O) interconnect switching fabric including the first switch and a second switch, first data packets over a first path between a first port of the first switch and a second port of the first switch, and second data packets over a second path between the first port and a third port of the first switch, the second switch to transport the first data packets between the first port of the first switch and a fourth port of the second switch over a third path; and
    modifying, by the first switch, a respective power state of the first, second or third ports based at least in part on relative power states of the first and second paths.

13. The method of claim 12, wherein modifying comprises modifying the power state of the first port to a higher one of the power states of the first path and the second path.

14. The method of claim 12, further comprising monitoring, by the first switch, the first and second ports for receipt of a power management request to modify the power state of the first port or the second port.

15. The method of claim 14, further comprising modifying, by the first switch, the power state of the first port or the second port based at least in part on the power management request.

16. The method of claim 14, further comprising:
modifying, by the first switch, a power state of the second port according to a power state of the first path; and
modifying, by the first switch, a power state of the third port according to a power state of the second path.

17. An apparatus, comprising:
a processor; and
an input/output (I/O) interconnect switching fabric coupled with the processor, comprising:
a first switch, to transport first data packets over a first path between a first port of the first switch and a second port of the first switch and second data packets over a second path between the first port and a third port of the first switch;
a power management unit, to modify a respective power state of the first, second or third ports based at least in part on relative power states of the first and second paths; and
a second switch to transport the first data packets between the first port of the first switch and a fourth port of the second switch over a third path.

18. The apparatus of claim 17, wherein the power management unit is to modify a power state of the first port according to a higher one of the relative power states of the first and second paths, wherein the power management unit is to modify a power state of the second port according to a power state of the first path, and to modify a power state of the third port according to a power state of the second path.

19. The apparatus of claim 17, wherein the apparatus is a selected one of a laptop, a netbook, a notebook, an ultrabook, a smartphone, a tablet, a personal digital assistant, an ultra mobile PC, a mobile phone, a desktop computer, a server, a printer, a scanner, a monitor, a set-top box, an entertainment control unit, a digital camera, a portable music player, or a digital video recorder.

* * * * *